B. FISCHLER.
DENTIST'S SOLDERING TOOL.
APPLICATION FILED MAR. 22, 1911.

1,011,597.

Patented Dec. 12, 1911.

Witnesses:

Bernard Fischler
Inventor
By his Attorney

UNITED STATES PATENT OFFICE.

BERNARD FISCHLER, OF BROOKLYN, NEW YORK.

DENTIST'S SOLDERING-TOOL.

1,011,597. Specification of Letters Patent. Patented Dec. 12, 1911.

Application filed March 22, 1911. Serial No. 616,055.

*To all whom it may concern:*

Be it known that I, BERNARD FISCHLER, a citizen of the United States of America, and a resident of Brooklyn, Kings county, New York, have invented certain new and useful Improvements in Dentists' Soldering-Tools, of which the following is a specification.

This invention relates to a dentist's soldering tool.

The object of the invention is to provide a practical, novel and useful soldering tool adapted for the use of dentists, jewelers, watchmakers or in other professions and trades.

The invention may be embodied in a device to form an attachment to a pair of tweezers, or the complete tool may embody the principles and detailed construction of the invention.

The invention will be more fully understood in connection with the accompanying drawing in which—

Figure 1:
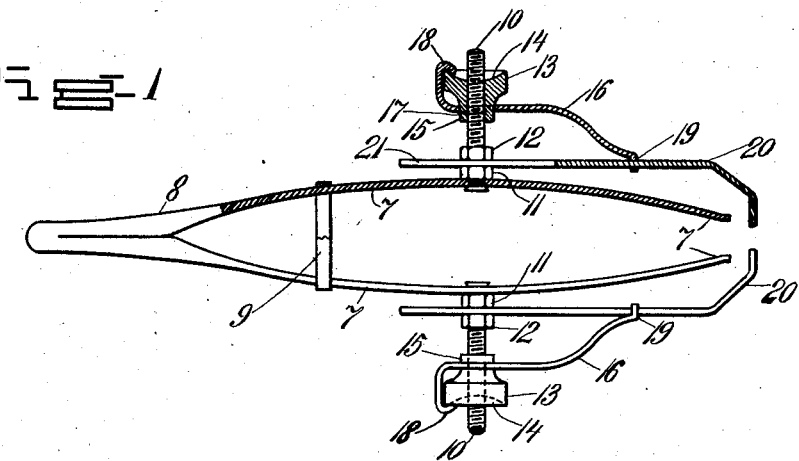
Figure 2:
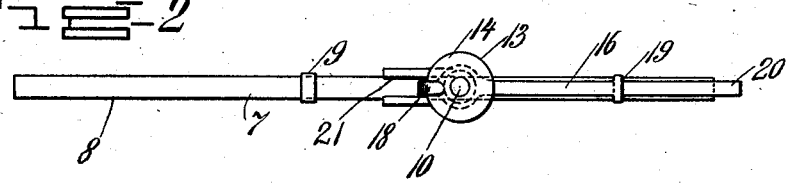
Figure 3:
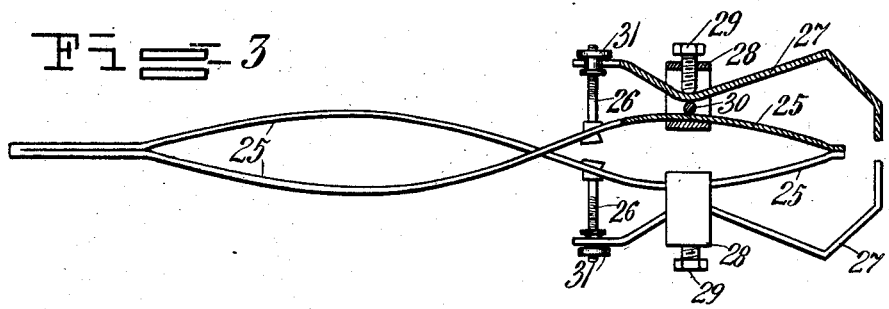
Figure 4:
Figure 5:
Figure 6:

Figure 1 shows a dentist's soldering tool embodying my invention partly in section. Fig. 2 is a plan view thereof. Fig. 3 shows a modified form of the invention, and Figs. 4, 5 and 6 are detail views of the clamping means shown in Fig. 3.

Referring to Figs. 1 and 2 the reference numerals 7, 7 represent the opposed spring jaws of a pair of tweezers 8. 9 is a ring or loop encircling the jaws for keeping the same together after an article to be soldered has been inserted between them, as will be understood. 10, 10 are threaded pivot posts secured to the jaws 7 and provided with lock nuts or other adjustable fastening means 11, 11 and 12, 12. A jaw adjusting head 13 is in threaded engagement with each of the posts 10 and has a scooped out portion or cup 14 and a narrower shank 15, 15. 16 are jaw levers having each an aperture 17 for the passage of the head shank 15 and a hook 18 engaging in the cup 14. The forward ends of the jaw levers are provided with openings 19 through which pass the outer jaws 20, 20. The rear ends of the jaws 20 are bifurcated as at 21 and pass between the lock nuts 11 and 12. The jaws 20 and jaw levers 16 are made of springy material.

When it is desired to solder pieces of metal together, for instance to add a small piece of gold to a dental crown, or for other purposes, the one piece of metal is gripped by the jaws 7, 7 and held firmly by the loop 9, while the crown, or other piece of metal is inserted between the jaws 20 and may be brought into the exact juxtaposition with relation to the first piece of metal in as much as the jaws 20 are adjustable by the means described. It will be seen that the lateral distance between the jaws 7 and 20 may be adjusted by sliding the latter on the posts 10, and by moving the heads 13 toward or away from the jaws 7, the jaws 20, through the instrumentality of the jaw levers 16 may be adjusted to grip the outer piece of metal firmly.

Another feature of this invention is that the jaws 20 and jaw levers 16 may be moved horizontally with the posts 10 as a pivot whereby I am able to effect very delicate and exact adjustment of the surfaces of the metals to be soldered with respect to one another.

After the metals have been adjusted in the jaws a small pointed blow pipe flame may be used to solder them together.

In the modification shown in Figs. 3 and 4 the numeral 25 represents a pair of tweezers of the X type. 26 is a post fixed to the tweezer jaw. 31 is a head in threaded engagement therewith and 27 is the outer jaw. 28 is a clamp having a clamping screw 29 and a pivot beam 30. The jaws 25 and 27 pass through the clamp 28 above and below the pivot beam. It will be seen that also in this construction the outer jaws may be adjusted laterally away from the inner jaws by either slightly moving them around the posts 26 the jaws being slightly norrower than the clamp to allow for this or by moving the clamp along the jaws 25 or by pulling the jaw 27 through the clamp. The grip of the outer jaws is adjusted by moving the heads 31 on the posts 26, whereby the jaws 27 are rocked on the pivot beams, yet are held firmly by the clamping screws 29.

In Figs. 5 and 6 there are shown upper pivot beams 32 carried by the screws 29.

It will be seen that I have provided a simple and inexpensive tool having two pair of jaws, and the one pair may be adjusted laterally in two different directions with respect to the other pair and the grip of the one pair of jaws may be adjusted independently. A still further adjustment is possible and important, namely, by moving the one adjusting head 14 or 31 farther in or out than the opposite head the outer jaws may be lifted or lowered with respect to the inner jaws.

Change in the detailed construction may of course be made within the principle of the invention.

I claim:

1. The combination with the arms of a pair of tweezers, of a post secured to each of the said arms, a separate jaw carried by each of the said posts, adjusting heads on the latter and jaw levers operated by the said heads for adjusting the said jaws.

2. The combination with the arms of a pair of tweezers, of a post secured to each of the said arms, a separate jaw carried by each of the said posts, means for adjusting and securing the said jaws on the said posts, adjusting heads on the latter and jaw levers in engagement with the said heads and the said jaws for adjusting the latter with respect to the said arms.

3. An attachment for the arm of a pair of tweezers comprising a post adapted to be secured to the said arm, a jaw secured to said post, an adjusting head on the latter and a jaw lever in engagement with the said head and the said jaw.

4. An attachment for the arm of a pair of tweezers comprising a post adapted to be secured to the said arm, a jaw adjustably secured to said post, an adjusting head on the latter and a jaw lever in engagement with the said head and the said jaw.

Signed at New York, N. Y., this 17" day of March, 1911.

BERNARD FISCHLER.

Witnesses:
  IVAN KONIGSBERG,
  E. VAN ZANDT.

---

Copies of this patent may be obtained for five cents each, by addressing the "Commissioner of Patents, Washington, D. C."